Patented Apr. 22, 1947

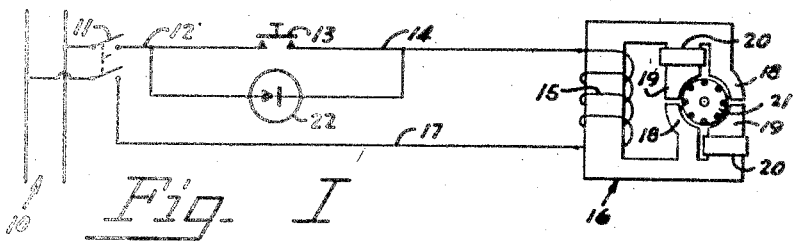
Fig. I
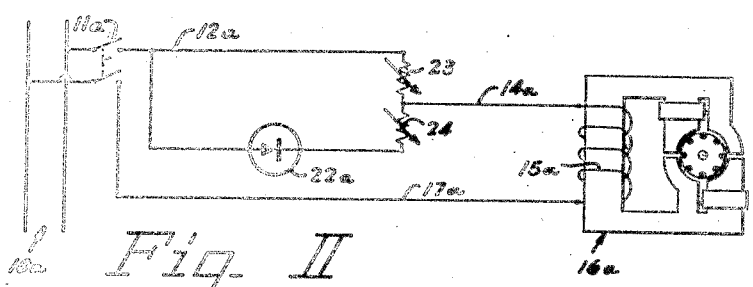
Fig. II
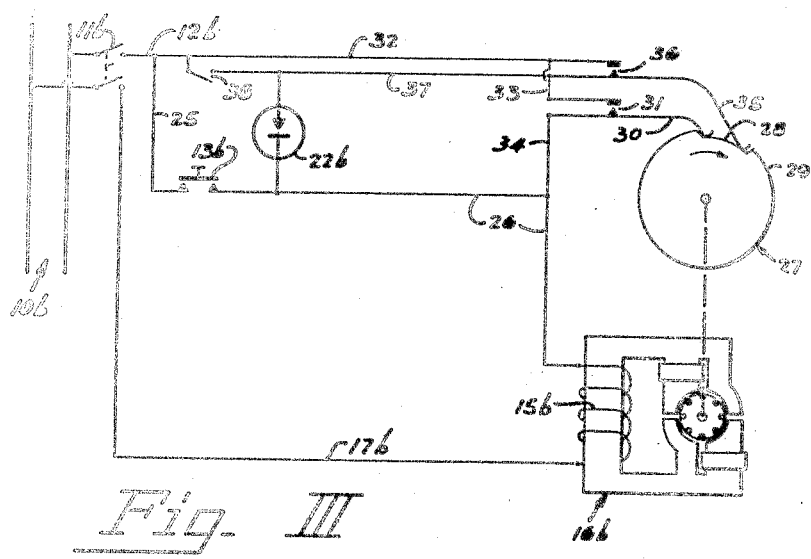
Fig. III
INVENTOR.
Lawrence S. Williams
BY
Marshall & Marshall
ATTORNEYS

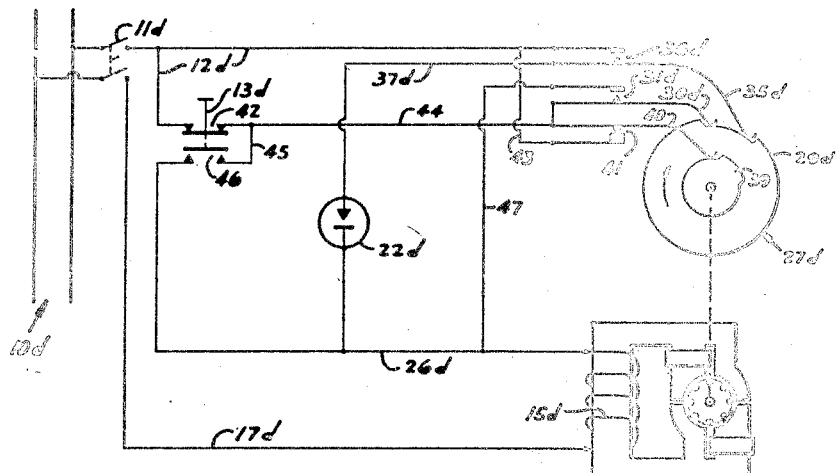
Fig. IV
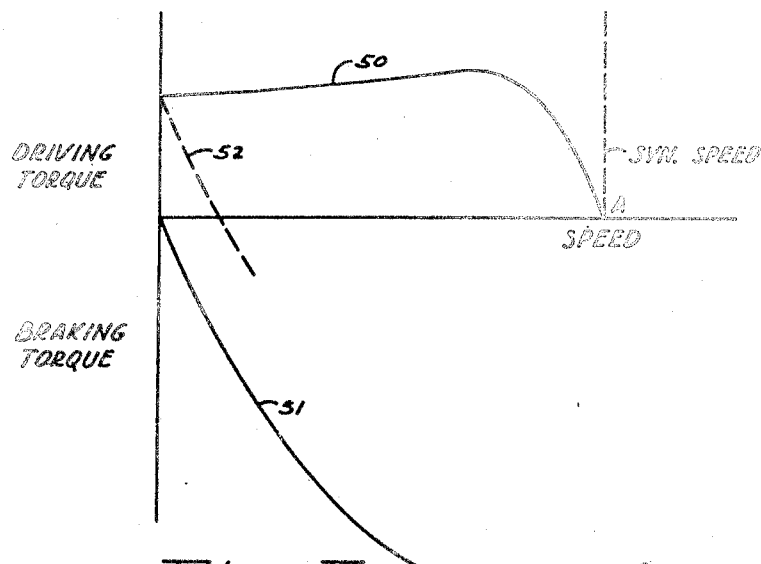
Fig. V

2,419,431

UNITED STATES PATENT OFFICE 2,419,431

INDUCTION MOTOR SPEED CONTROL

Lawrence S. Williams, Toledo, Ohio, assignor to Toledo Scale Company, Toledo, Ohio, a corporation of New Jersey Application November 3, 1943, Serial No. 508,772

5 Claims. (Cl. 172—278)

This invention relates generally to speed controls for electric motors and in particular to controls for varying the operating speed of small alternating current motors from their full speed to a very small fraction of their full speed. This application is a continuation-in-part of copending application Serial Number 404,309, filed July 28, 1941.

In any electric motor the turning effort of the armature is produced by the interaction of a magnetic field produced in the armature reacting with a magnetic field produced in a stationary frame. The existing electric motors may be divided into two general classes depending upon whether the magnetic field rotates or remains stationary in space. The rotating magnetic field class includes most alternating current types of motors such as polyphase induction and synchronous motors, single phase shaded pole motors, and the various varieties of split-phase motors. The other class, the stationary magnetic field class, includes all forms of direct current motors, universal motors, and the various types of commutating alternating current motors.

In the first of these classes of motors, i. e., the rotating magnetic field class, the magnetic field of the armature is produced directly by the rotating field in the frame. The rotating magnetic field induces magnetic poles in the armature which rotate with the field. If the armature iron has no hysteresis loss and is laminated to prevent eddy currents, the rotation of the poles induced in the armature has no turning effort.

Actual motors employ forces produced by either the hysteresis loss or the eddy currents in either the iron or a simple winding to provide the driving effort. Further, if it is desired that the armature run exactly in step with the rotating magnetic field the armature iron is shaped so that stronger magnetic poles will be formed at certain points around the armature than at other points. The magnetic field pulls those points in the armature at which the strogner poles are induced into alignment with the field and the armature rotates synchronously.

Small clock motors employ a field structure which with shading coils in the frame produces a rotating magnetic field. The associated armature comprises one or more steel disks from which D-shaped pieces have been punched to leave steel rings with cross pieces along their diameters. These rings are mounted on the armature shaft with the cross pieces aligned. In operation, the armature is brought up to speed by the hysteresis effect in the ring and is brought into step by the magnetic effect of the cross bar.

The eddy current effect is employed in larger motors. In this case the armature comprises a stack of laminated disks mounted on the armature shaft. A winding, ordinarily called a "squirrel cage," composed of a number of conducting bars placed in slots in the periphery of the disks and connected together at their ends provides a low resistance path for the eddy currents. These currents are generated by the rotating magnetic field and produce an armature field which reacts with the rotating field to produce the driving torque. The armature current and resulting torque is dependent upon the difference in speed between the rotating field and the armature and disappears when they rotate synchronously. The difference in speed is called "slip." This type of motor may also be made to operate synchronously by providing symmetrically spaced flats on the sides of the armature to produce a non-continuously symmetrical shape for the armature disks and variations in the air gap. In this case the induced poles are stronger where the air gap is less and are strong enough to pull the armature into step with the field. When so operating there are no currents induced in the armature winding.

In the second class of motors, i. e., those having stationary magnetic fields, the armature is provided with a winding connected through a commutator to a source of current. Current flowing through the armature winding produces a magnetic field which reacts with the stationary field to provide the driving torque. Through the action of the commutator this armature field is held stationary in space as the armature rotates. The current in the armature is determined by the difference between the applied voltage and the voltage generated in the armature winding due to its rotation in the magnetic field. The voltage generated is proportional to the armature speed and the field strength. The speed of this type of motor may be controlled throughout a wide range by varying the voltage applied to the armature or the strength of the field.

Numerous attempts have been made to control the speed of motors of the first class by changing the applied voltage. In general they are not satisfactory because by varying the voltage applied to a rotating magnetic field motor the strength of the field is varied but its rotational speed remains constant. If this type of control is applied to a squirrel cage type of motor, one finds that the driving torque is materially reduced but that the speed may be controlled only from approximately 70% of synchronous to synchronous speed. Because it is an inherent characteristic of an induction motor to exhibit a substantially constant torque throughout the low speed range, i. e., speeds from stand-still to 60% or 70% of synchronous speed, any attempt to operate the motor in this speed range by reduction of applied voltage results in large speed changes for small load changes, i. e., instability.

Some induction motors, for example, phonograph motors, have been successfully operated in this speed range by the application of a mechanical brake acuated by a sensitive governor.

It is also known that if direct current is applied to the field of a squirrel cage motor while the motor is coasting, currents will be induced in the armature winding which will quickly bring the motor to a stop. This is commonly called "dynamic braking." The braking torque generated by a given direct current is, at the lower speeds, directly proportional to the armature speed. It may easily exceed full motor torque at as low a speed as 5% of normal speed.

The present invention is the utilization of the "dynamic braking" phenomena as a governor to control the speed of a motor. With the shaded pole, or, in fact, any rotating field structure driving a squirrel cage armature, the dynamic braking effect of direct current can be superimposed or added to the constant-torque at slow speed characteristic of an induction motor to give a slow operating speed having the same absolute speed stability or regulation as the motor has at full speed. This is due to the rapid change in braking torque with speed.

It is, of course, possible to vary the braking torque by varying the direct current and thus obtain a flexible speed control.

The principal object of this invention is to provide a speed control for an induction motor which produces an extremely low operating speed without reduction of the motor's stalled torque.

Another object is to provide speed control for an induction motor by superimposing direct current upon the exciting alternating current.

Another object is to provide adjustable speed control for an induction motor by superimposing a variable amount of direct current upon the exciting alternating current.

A still further object is to provide a motor control for a cycle of operation incorporating a portion of high speed operation, of low speed operation, and a definite stop, in which the slow speed operation is obtained by superimposing direct current on the exciting alternating current supplied to the motor.

These and other objects and advantages are obtained by the control circuits illustrated in the drawings in which:

Figure I is a simple schematic circuit diagram in which a diode half-wave rectifier supplies a direct current superimposed on alternating current to obtain slow speed operation.

Figure II is a similar circuit diagram in which adjustable resistances to provide speed control have been added.

Figure III is a schematic circuit diagram showing the incorporation of cam-actuated switches to provide cyclic control.

Figure IV is a schematic circuit diagram of another version similar to that shown in Figure III but incorporating certain safety features.

Figure V is a torque vs. speed curve showing the theory of operation.

These specific drawings and the accompanying description are intended to show the applications but not the limitations of the invention.

Figure I is a simple schematic diagram illustrating a method for obtaining stable low-speed operation of a shaded-pole induction motor. Current is taken from an alternating current power line 10 through a disconnect switch 11 and flows through a lead 12, a push button 13 which is closed to operate the motor at high speed, a lead 14, the exciting coil 15 of a motor 16, and a lead 17 to the disconnect switch 11 and back to the power line 10. This current energizes the motor field and produces magnetic flux in the pole tips 18 and 19. The latter pole tips 19 are provided with short circuited conducting bands 20 known as "shading coils" in which are induced currents which cause the flux in the pole tips 19 to lag in time behind the flux passing through the pole tips 18. This combination, in effect, produces a rotating magnetic field in the space enclosed by the pole tips and occupied by an armature 21 of conventional squirrel cage construction. Such a squirrel cage armature construction comprises a series of circular soft-iron disks mounted on a shaft and having a number of slots cut in its periphery substantially parallel to the axis of the shaft. Copper rods are inserted in the slots and at their ends are conductively connected together by low resistance end plates. When such an armature is subjected to a rotating magnetic field, such as is produced by the pole tips 18 and 19, currents are induced in the armature windings formed by the copper bars and end plates which react with the rotating field to produce a driving torque.

If, while the armature of such a motor is rotating, its field coil is excited by direct current rather than by alternating current a non-rotating or stationary field is set up between the pole tips and currents are induced in the armature in the same manner as currents are generated in a direct current generator. Due to the short-circuiting effect of the end plates these armature currents are quite large and produce a large braking torque. The amount of the braking torque so produced is proportional to the rotating speed of the armature and the strength of the field produced by the direct current and disappears at zero speed.

By combining the driving torque as produced by alternating current and the braking torque as produced by direct current a slow but positive rotation of the armature is produced. The slow speed of a motor operated in this manner is that speed at which the braking torque produced by the direct current plus the external load equals the driving torque produced by the alternating current. The operation at this speed is highly stable and positive because the driving torque produced by the alternating current is relatively independent of speed and the braking torque produced by the direct current is zero at zero speed and increases very rapidly with increase in speed.

In Figure I a half-wave rectifier 22 is shown connected in parallel with the push button switch 13. Thus, when the disconnect switch 11 is closed and the push button switch 13 is open half-wave rectified current flows through the exciting coil 15 of the motor 16. The resulting half-wave rectified current consists of an alternating current component and a direct current component. Each produces its effect independently of the other, the alternating current component to run the motor, the direct current component to govern the speed of the motor. By energizing the motor with this combination of alternating current and direct current simultaneously extremely low-speed stable operation results. It should be noted that because the braking torque produced by the direct current disappears at zero speed the stall torque of the motor is not reduced.

This reduction of braking effort to zero at zero speed is not obtained with armatures designed to operate synchronously. The non-continuously symmetrical magnetic structure, i. e., the cross bar of the clock motor armature or the variable air gap of the squirrel cage armature, which causes the armature to rotate synchronously with the rotating field, causes it to lock up with the direct current field and prevent slow speed operation. To operate successfully at reduced speeds under the combined influence of alternating and direct current the armature must be magnetically continuously symmetrical, i. e., the armature must contain no irregularities which might cause the induced magnetic poles to be stronger in one part of the armature than another.

Since the operating speed is determined by the relative magnitude of the alternating and direct current components of the exciting current it is possible to control the motor speed by adjusting the relative magnitudes of these components. A circuit for accomplishing this result is shown in Figure II wherein alternating current for producing high speed operation flows from an alternating current power line 10a through a disconnect switch 11a, a lead 12a, an adjustable resistance 23, a lead 14a, the field coil 15a of a motor 16a, and a lead 17a to the disconnect switch 11a and the power line 10a. Current also flows through an adjustable resistance 24 and a rectifier 22a connected in parallel with the adjustable resistance 23. By adjustment of the resistances 23 and 24 the relative magnitudes of the alternating current and direct current components may be varied over a wide range to effect corresponding variations in the speed of the motor.

This type of motor control may be very advantageously used in automatic devices where it may be desired that for each operation of a push button the motor shall complete one cycle of the desired operation. Such a cycle of operation may consist of a period of high speed motor operation and a period of low speed motor operation immediately preceding the end of the cycle. Or it may be desirable that the motor shall operate continuously with alternate periods of high and low speed. Figure III illustrates a circuit by which these types of operation may be accomplished. In this circuit when the disconnect switch 11b is closed current flows from the power line 10b through the switch 11b, leads 12b and 25, a push button 13b which is closed to start the operation, a lead 26 to the field coil 15b of the motor 16b and then through a return lead 17b to the disconnect switch 11b. The motor immediately starts to turn at high speed and in addition to any connected equipment turns the cam 27 which is provided with portions 28 and 29 of different radii. The rotation of the cam 27 in the clockwise direction as indicated causes the finger 30 to ride onto the higher surface 29 thereby closing contacts 31. Current then flows from the lead 12b through leads 32 and 33, the contacts 31, and a lead 34 to the lead 26 thereby shunting the push button switch 13b allowing it to be opened without stopping the motor. As the cam 27 continues to turn, another finger 35 also rides onto the higher cam surface 29 thereby closing contacts 36. The closure of the contacts 36 completes a circuit from the lead 32 through a lead 37 and a rectifier 22b to the lead 26. The closure of the contacts 36 has no immediate effect because the circuit thus completed is shorted by the closed contacts 31. As the cam 27 continues to turn, a point is reached when the finger 30 drops from the higher surface 29 to a lower surface 28 thus opening the contacts 31. Current then is forced to flow through the contacts 36 and the rectifier 22b which energizes the motor with the combination of direct and alternating current which produces slow speed operation. The motor then creeps forward and slowly rotates the cam 27 until the contact finger 35 also drops from the surface 29 to the lower surface 28 thus opening the contacts 36. At this point, as the circuits through the push button and the contacts 31 are open, the motor is completely deenergized and stops.

If, however, it is desired that the motor should return to high speed operation instead of stopping, a switch 38 in parallel with the contacts 36 may be closed, thus eliminating the effect of opening the contacts 36. With this connection the motor operates at high speed as long as the finger 30 is on the higher surface 29 of the cam 27 and operates at low speed when the finger 30 is on the lower surface 28.

If, in the automatic arrangement just described, the operator should continue to hold the push button switch 13b in its closed condition the motor would operate continuously at its high speed since the cam 27 and the contacts 31 and 36 then have no control on its operation. This may be undesirable or in some cases dangerous and may be eliminated by the circuit arrangement shown in Figure IV. In this arrangement an additional cam 39 is employed which through a finger 40 opens and closes a set of contacts 41. In addition, a push button switch is provided with a set of normally closed contacts 42. In this circuit, when the push button 13d is depressed, current flows from the power line 10d through a disconnect switch 11d, leads 12d and 43, normally closed contacts 41, leads 44 and 45, the now closed contacts 46 of the push button 13d, and a lead 26d to the field coil 15d of the motor 16d and then through a return lead 17d to the disconnect switch 11d. The motor starts and runs at high speed turning the cams 27d and 39 in the direction indicated. A finger 30d immediately rides onto the higher surface 29d of the cam 27d thus closing the contacts 31d and completing a circuit from the lead 44 through a lead 47 to the lead 26d. This circuit shunts the push button 13d which may then be released without stopping the motor. Further rotation of the cams 27d and 39 causes the finger 35d to ride onto the higher surface 29d thus closing the contacts 36d to complete the circuit from the lead 12d through the contacts 36d, a lead 37d, a half-wave rectifier 22d, to the lead 26d leading to the motor. The closure of the contacts 36d has no immediate effect because the circuit thereby completed is shorted by the previously closed contacts 31d. As the cams continue to turn a point is reached where the finger 40 rides onto the higher surface of the cam 39 thereby opening the contacts 41. If the push button 13d has been released at the proper time the opening of the contacts 41 will have no effect, as power will be supplied to the lead 44 through the normally closed contacts 42 of the push button 13d. If, however, the push button 13d has not been properly released the contacts 42 will be open and the opening of the contacts 41 by the action of the cam 39 will interrupt the flow of alternating current to the motor by way of the contacts 31d and lead 47. As the circuit through the rectifier 22d is completed at this time the motor will operate at slow speed for the remainder of its cycle of operation. The premature slowing down of the motor, occasioned by the opening of the contacts 41, is a warning to the operator to release the push button 13d. If the operator continues to hold the push button closed the motor will complete its cycle of operation at slow speed and then immediately start the next cycle. Thus the only effect of not releasing the push button is to produce a continuous sequence of normal operations.

The foregoing description has been directed to the speed control of a shaded pole motor. The method of control is not so limited but may be applied to any rotating field type of motor. The essential feature of the invention is the combination of the rotating field drive with a stationary field brake. Whether the rotating field is produced by a polyphase winding, a single phase split-field winding or a shaded pole winding is immaterial.

Figure V is a graph showing the characteristics of an induction motor operated according to the instant invention. The operating speed of the motor is plotted along the horizontal axis, the driving torque of the motor above the axis, and the braking torque below the axis. A line 50 represents the torque vs. speed characteristic of a shaded pole motor when operated on alternating current alone. The point A, the intersection of the line 50 and the horizontal axis, represents synchronous speed at which there is no slip between the armature and the rotating field to generate currents in the armature and driving torque. At slightly lower speeds the slip between the rotating field and the armature generates currents in the armature which produce a driving torque approximately proportional to the slip. If the magnitude of the current generated in the armature were limited only by the resistance of the armature conductors and the end plates, the driving torque would be proportional to slip speed and increase continuously to zero armature speed. However, the armature current is also limited by the inductance of the armature circuit and as the frequency of the armature current increases with the slip, the torque, instead of increasing with slip, becomes constant or may, in fact, decrease as the armature speed decreases. Line 50 of the graph shows this characteristic.

If the motor is energized with direct current a stationary magnetic field is set up and the rotation of the armature in the stationary field generates a current which opposes said rotation thus providing a braking torque. A line 51 on the graph represents this effect. At very low speeds the amount of torque so produced is small and increases directly with the speed. At higher speeds, due to the inductance of the armature circuit, the currents produced are no longer directly proportional to speed and the braking torque tends to become constant instead of increasing with respect to speed or may even decrease somewhat at the higher speeds. The actual motor speed is determined by the relative magnitudes of these opposing effects. Their algebraic sum is indicated by the dotted line 52 which shows that the stalled torque is not materially reduced but that the no-load speed is very materially reduced. It should be noted that the slope of the line 52 is practically the same as that of the line 51. This is of practical significance as it is a criteria of stable operation. By the proper adjustment of the magnitude of the direct-current component it is possible to materially increase the braking torque (represented by the line 51) so that the actual change of speed with change of load at very slow speeds, in the order of 5% or less of synchronous speed, will be less than the corresponding speed change with load near synchronous speed. Or, the direct-current component may be decreased resulting in a decreased braking torque and a correspondingly increased speed of operation. In neither case is the stall torque of the motor affected.

It is repeated that a requisite to the successful application of this method of speed control is that the armature of the motor shall be magnetically continuously, symmetrical. Any condition in the armature which results in a variation in the reluctance of the magnetic circuit induces magnetic forces which cause the armature to align itself with the field set up by the direct current rather than to rotate slowly as described.

As the motor speed is determined by the equality between the retarding effect of the field produced by the direct current and the driving effect of the rotating field produced by the alternating current, it is apparent that by proper proportion of the currents any speed between zero and normal operation may be obtained.

Having described the method of obtaining satisfactory slow speed operation of an induction motor and a circuit for a cyclical control utilizing the slow speed, I claim:

1. In a control for a shaded pole induction motor, in combination, a cam actuated by said motor, a plurality of switches operated by said cam, a manually operated switch, and a half wave rectifier, said rectifier and said switches being connected in parallel circuits, said combination of parallel circuits being connected in series with the motor, the first of said parallel circuits including the manually operated switch, the second of said parallel circuits including a cam operated switch and the third of said parallel circuits including the rectifier and one of said cam operated switches.

2. In a control for a shaded pole induction motor, in combination, cams actuated by said motor, a plurality of switches operated by said cams, a normally open and a normally closed manually operable switch, and a half wave rectifier, said rectifier and said switches being distributed in three parallel circuits and the combination of circuits being connected in series with the motor, the first of the parallel circuits including the rectifier and one cam operated switch, the second of the parallel circuits including the manually operable switches, and the third of the parallel circuits including two cam operated switches, and a connection between the junction of said manually operable switches and the junction between the last mentioned cam operated switches.

3. In a control for an induction motor, in combination, a cam actuated by said motor, a plurality of switches operated by said cam, an independently operated switch, and a half wave rectifier, said rectifier and said switches being connected in parallel circuits, said combination of parallel circuits being connected in series with the motor, the first of said parallel circuits including the independently operated switch, the second of said parallel circuits including a cam operated switch and the third of said parallel circuits including the rectifier and one of said cam operated switches.

4. In a control for an induction motor, in combination, cams actuated by said motor, a plurality of switches operated by said cams, a normally open and a normally closed independently operable switch, and a half wave rectifier, said rectifier and said switches being distributed in three parallel circuits and the combination of circuits being connected in series with the motor, the first of the parallel circuits including the rectifier and one cam operated switch, the second of the parallel circuits including the independently operable switches, and the third of the parallel circuits including two cam operated switches, and a connection between the junction of said independently operable switches and the junction between the last mentioned cam operated switches.

5. In a control for a shaded pole induction motor, in combination, a switch actuated by the motor, an independently operable switch, and a half wave rectifier, said rectifier and said switches being connected in parallel circuits, the combination of parallel circuits being connected in series with the motor, the first of the parallel circuits including the independently operable switch and the other of the parallel circuits including the motor actuated switch and the rectifier.

LAWRENCE S. WILLIAMS.

REFERENCES CITED

The following references are of record in the file of this patent:

UNITED STATES PATENTS

| Number | Name | Date |
|---|---|---|
| 1,992,826 | Karasawa | Feb. 26, 1935 |
| 2,008,538 | Baumeister | July 16, 1935 |
| 2,103,356 | Fisher | Dec. 28, 1937 |
| 2,119,205 | Doyle et al. | May 31, 1938 |
| 2,304,604 | Schweitzer | Dec. 8, 1942 |
| 1,911,356 | Eames | May 30, 1933 |
| 2,193,642 | Parvin | Mar. 12, 1940 |
| 2,196,402 | Snyder | Apr. 9, 1940 |